United States Patent [19]

Barton

[11] Patent Number: 4,842,624
[45] Date of Patent: Jun. 27, 1989

[54] APPARATUS FOR CLEANING AIR FILTERS

[76] Inventor: Ronald R. Barton, Rte. 1, Sterling, Colo. 80751

[21] Appl. No.: 195,954

[22] Filed: May 19, 1988

[51] Int. Cl.$^4$ .................... B01D 29/06; B01D 29/28
[52] U.S. Cl. .................................... 55/291; 55/293; 55/294; 55/302; 55/304; 55/305
[58] Field of Search ............... 55/283, 291, 293, 294, 55/299, 304, 305

[56] References Cited

U.S. PATENT DOCUMENTS

| | | | |
|---|---|---|---|
| 484,717 | 10/1892 | Ince | 55/299 X |
| 1,949,002 | 2/1934 | Annis | 55/294 X |
| 2,125,574 | 8/1938 | Knight et al. | 55/293 X |
| 2,723,725 | 11/1955 | Keiffer | 55/291 |
| 3,251,175 | 5/1966 | Black, Jr. | 55/294 |
| 3,345,805 | 10/1967 | Sherrill | 55/271 |
| 3,360,907 | 1/1968 | Clark, Jr. et al. | 55/283 |
| 3,423,905 | 1/1969 | Chambers | 55/294 |
| 3,472,002 | 10/1969 | Brown et al. | 55/294 X |
| 3,606,735 | 9/1971 | Baigas, Jr. | 55/294 X |
| 3,639,940 | 2/1972 | Carlson et al. | 55/288 X |
| 3,867,291 | 2/1975 | Schmidt, Jr. et al. | 55/304 X |
| 4,258,451 | 3/1981 | Sommerfeld | 55/300 X |
| 4,266,953 | 5/1981 | Matthys et al. | 55/294 |
| 4,328,014 | 5/1982 | Burgoon et al. | 55/300 |
| 4,345,353 | 8/1982 | Sommerfeld | 55/300 X |
| 4,364,755 | 12/1982 | Ferri | 55/290 |
| 4,481,021 | 11/1984 | Kinney, Jr. et al. | 55/294 X |
| 4,572,745 | 2/1986 | House | 55/293 X |

FOREIGN PATENT DOCUMENTS 2651892  5/1978  Fed. Rep. of Germany ........ 55/304

Primary Examiner—Robert Spitzer
Attorney, Agent, or Firm—Fields, Lewis, Pittenger & Rost

[57] ABSTRACT

An apparatus for cleaning air filters by a combination of vibration, air pressure, and suction. A support member includes a first inclined wall sloped more steeply than a second inclined wall, providing generally V-shaped supporting surfaces which cause the filter being cleaned to rotate as it is vibrated. The vibration of the filter also loosens trapped impurities therefrom, and this vibration is enhanced by resiliently suspending the support member from a housing. The loosened impurities fall down the slopes of the inclined walls and are removed by suction provided in a channel extending lengthwise along the bottom of the support member. An exhaust blower is connected to a port in the suction channel to apply suction to the filler and to remove loosened impurities. The exhaust blower is also connected to an inner suction tube, which applies suction to an inner periphery of the air filter. An air diverter directs the exhaust air flow through either the suction channel, the suction tube, or a combination of both. An air blowing tube is provided to blow pressurized air from spaced air nozzles through a selected inner or outer periphery of the air filter to loosen trapped impurities therefrom. The blowing tube reciprocates across the selected filter periphery to provide a thorough cleaning of the filter. The suction and blowing tubes preferably telescope vertically in sleeves to accommodate filters of differing diameters. The suction and blowing tubes may also be tiltably mounted to allow cleaning of filters of different shapes, such as conical filters.

29 Claims, 6 Drawing Sheets

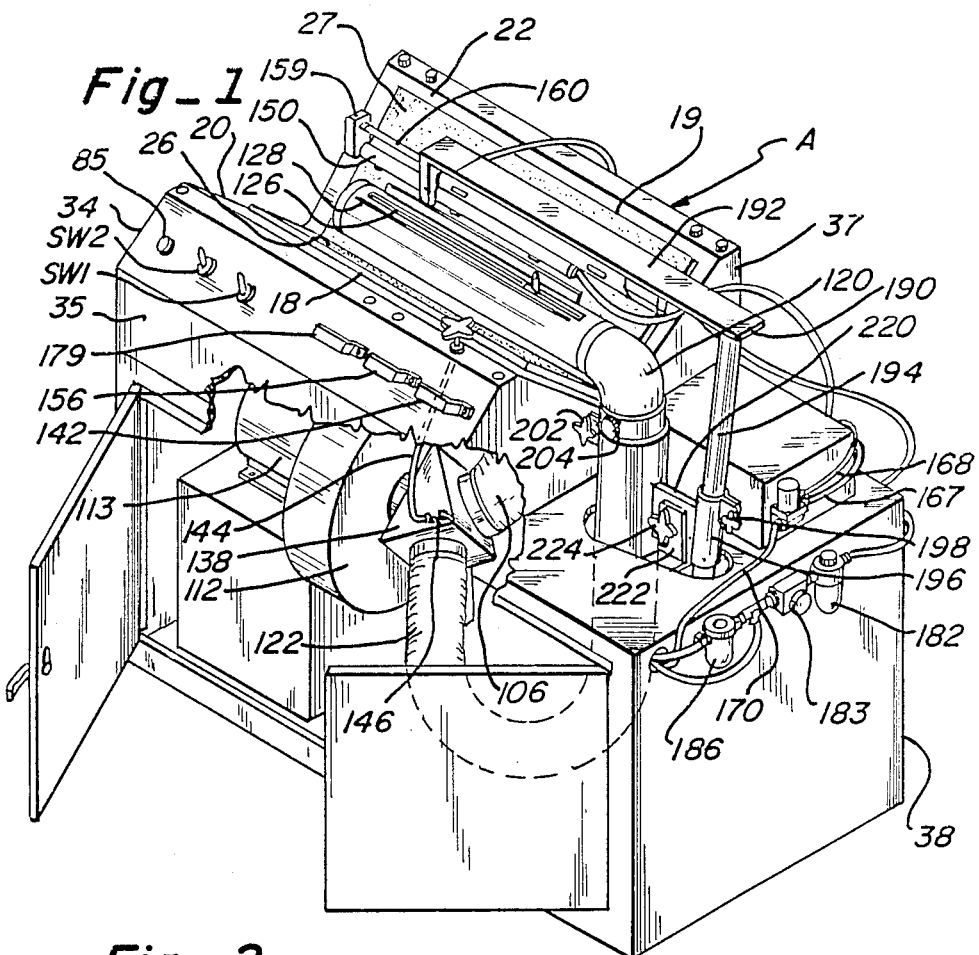
Fig_1
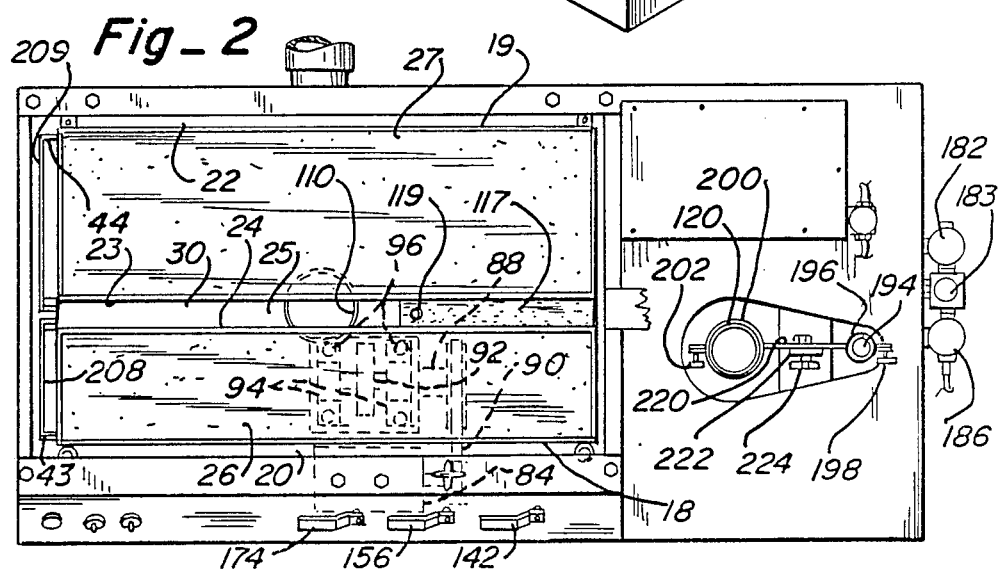
Fig_2

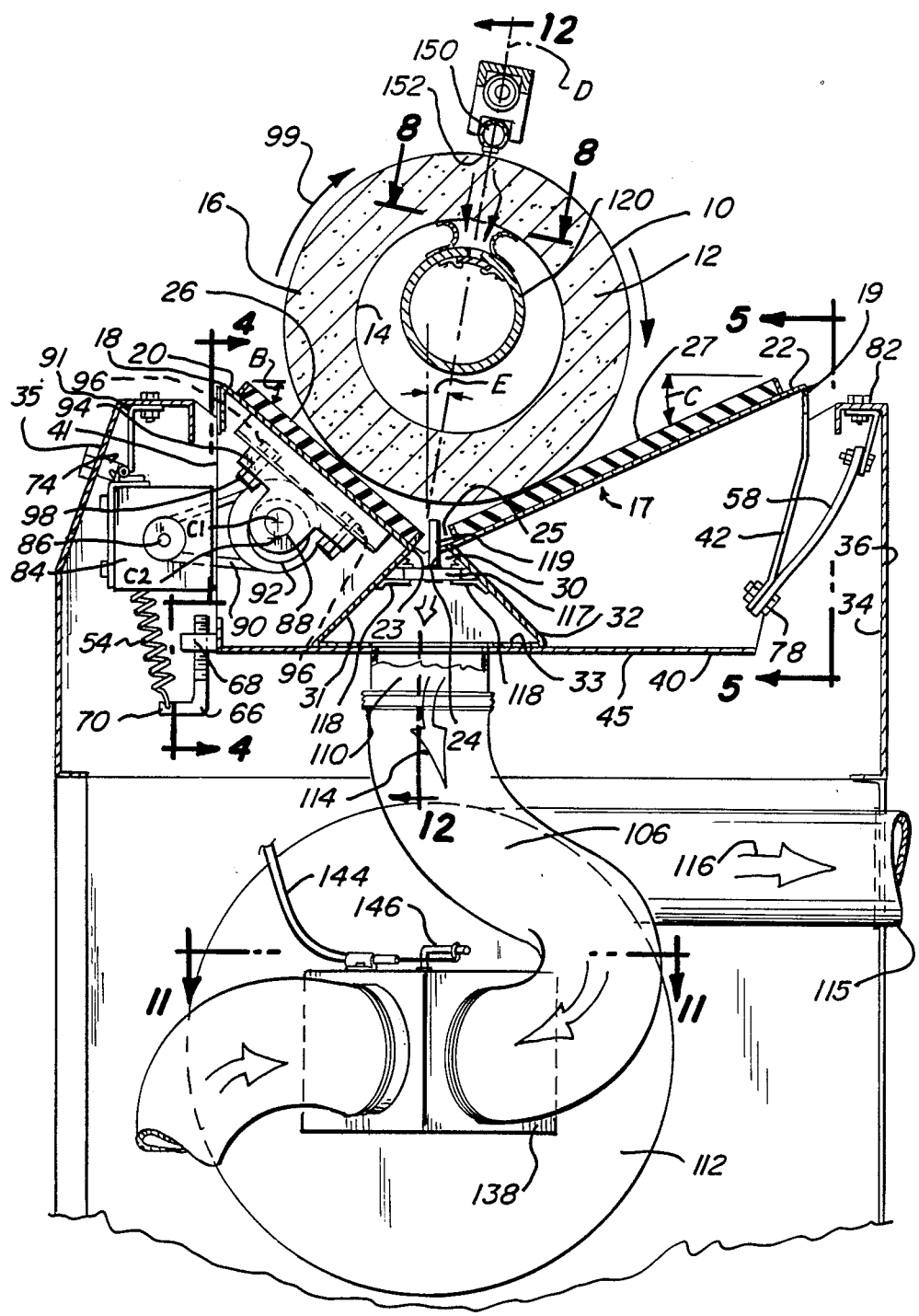
Fig_3

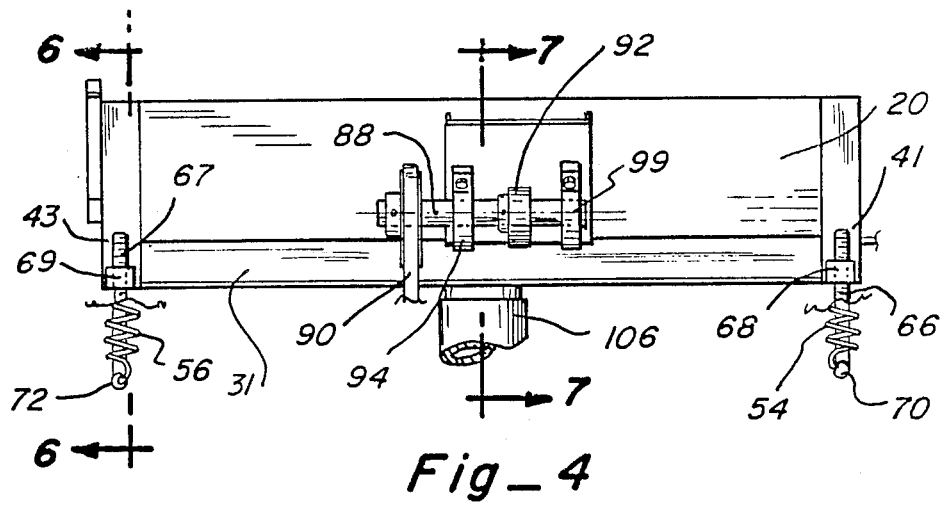
Fig_4
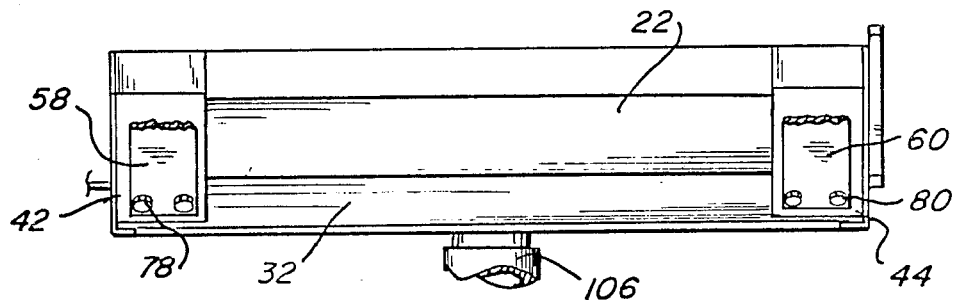
Fig_5
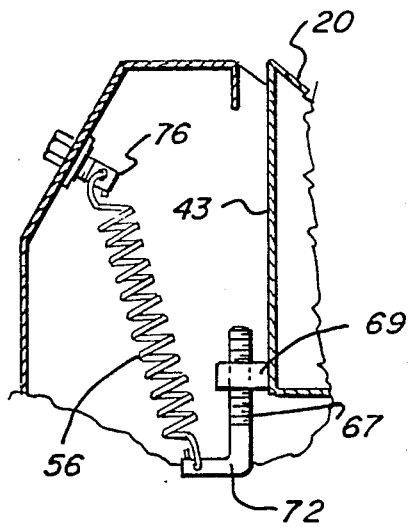
Fig_6
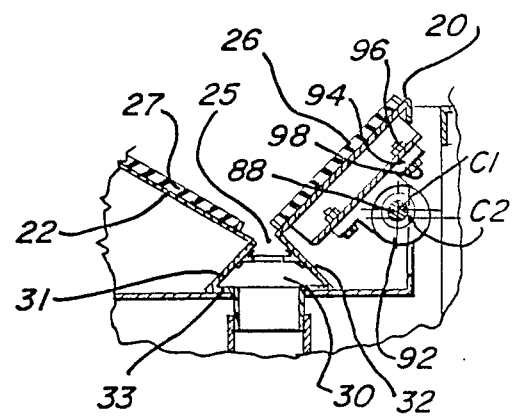
Fig_7

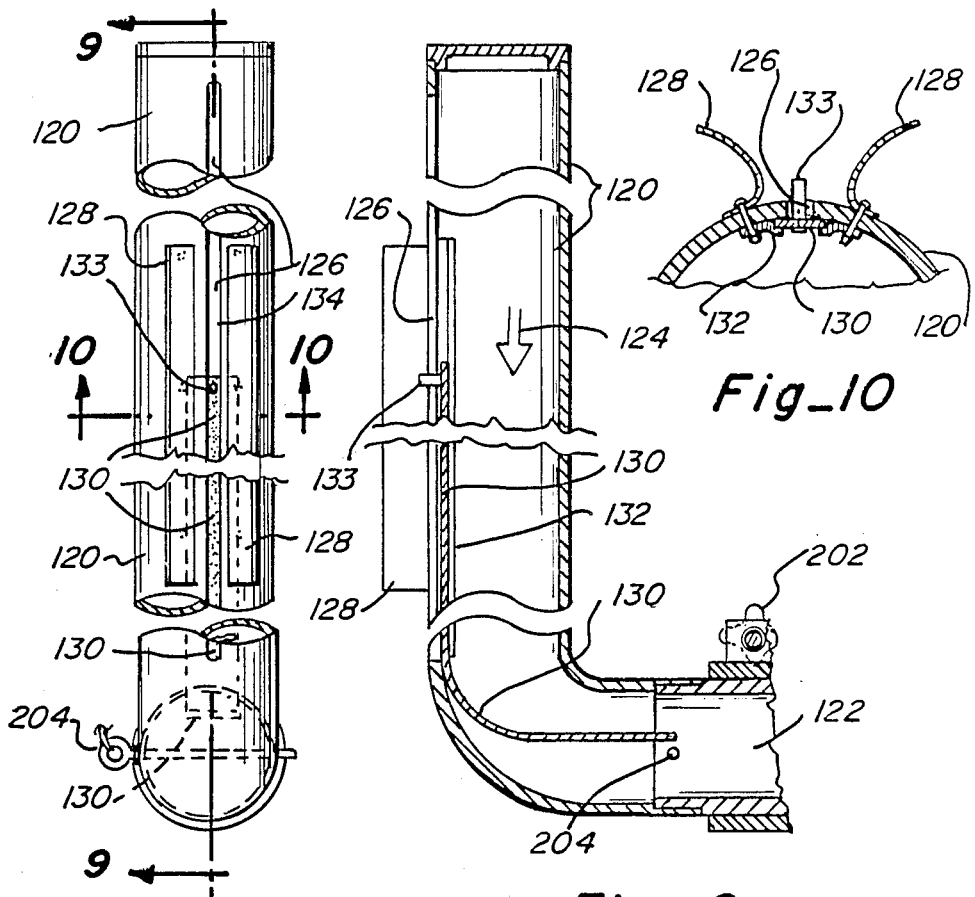
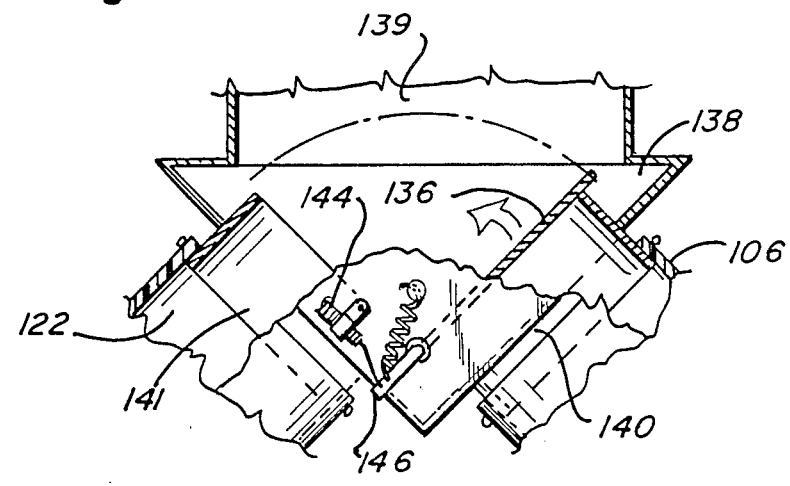

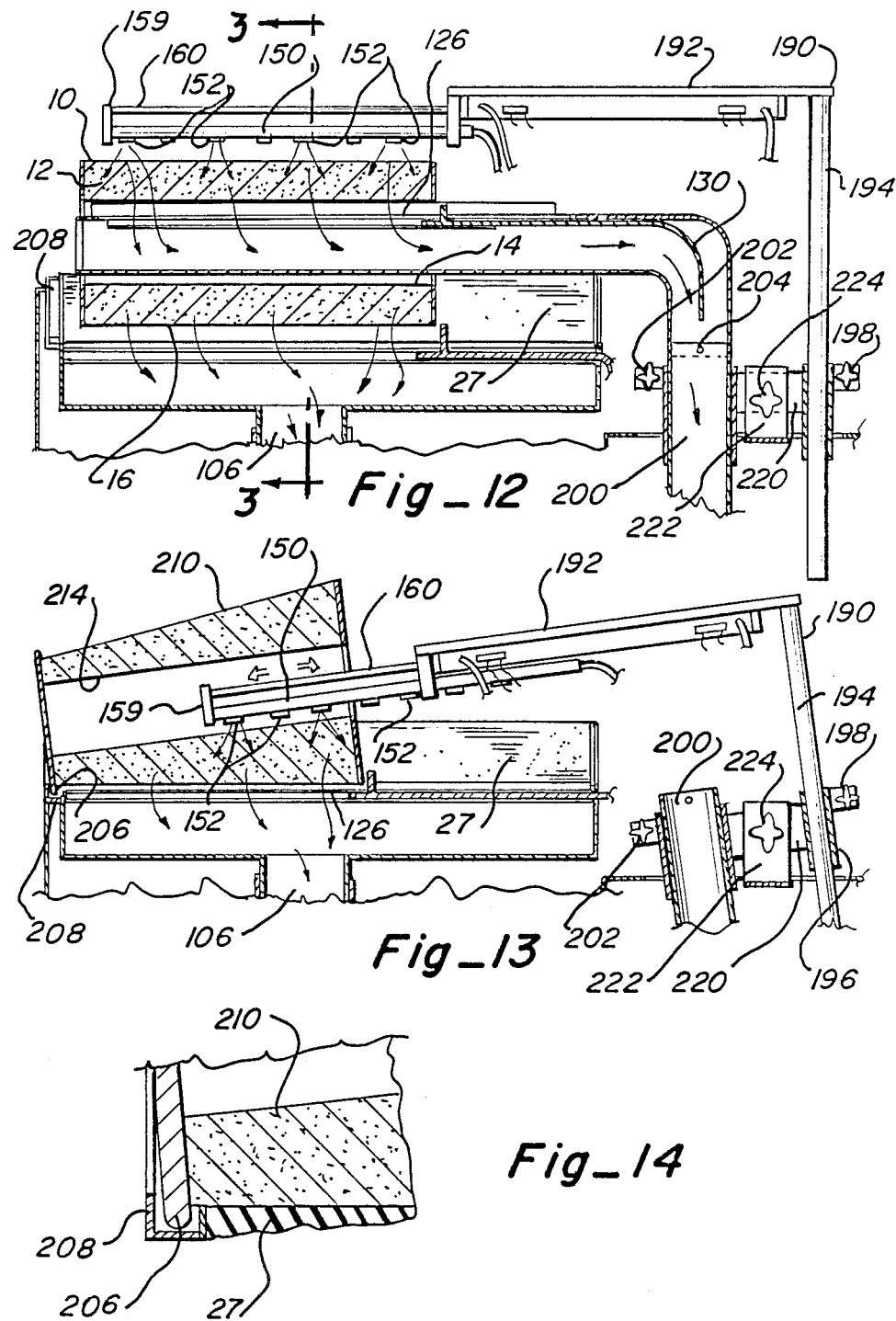

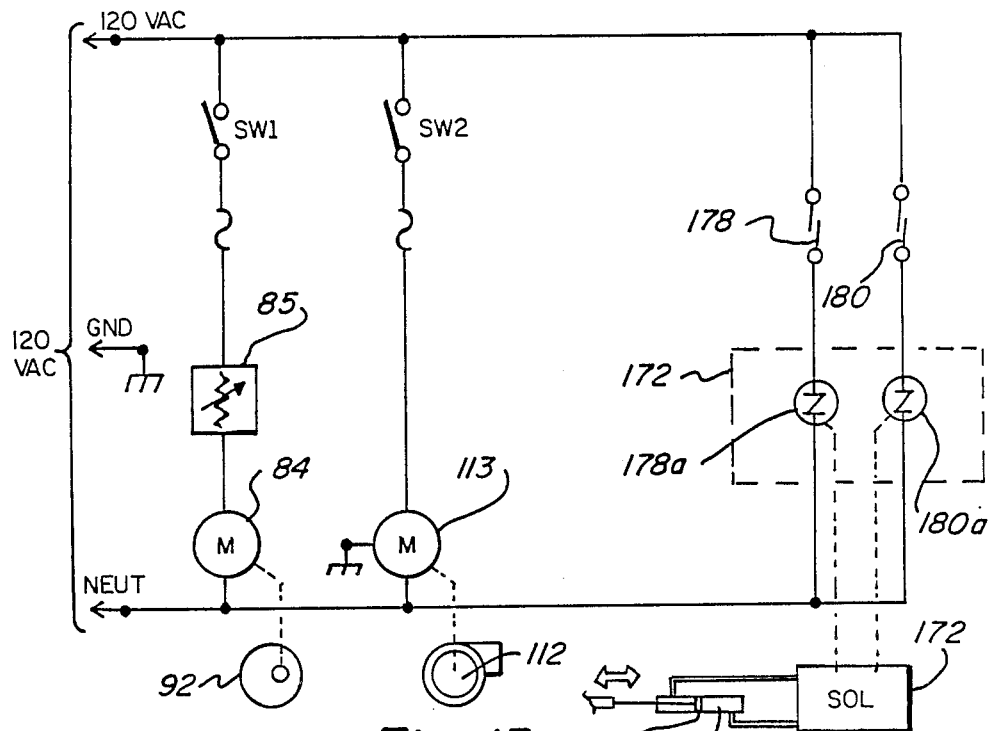
Fig_15
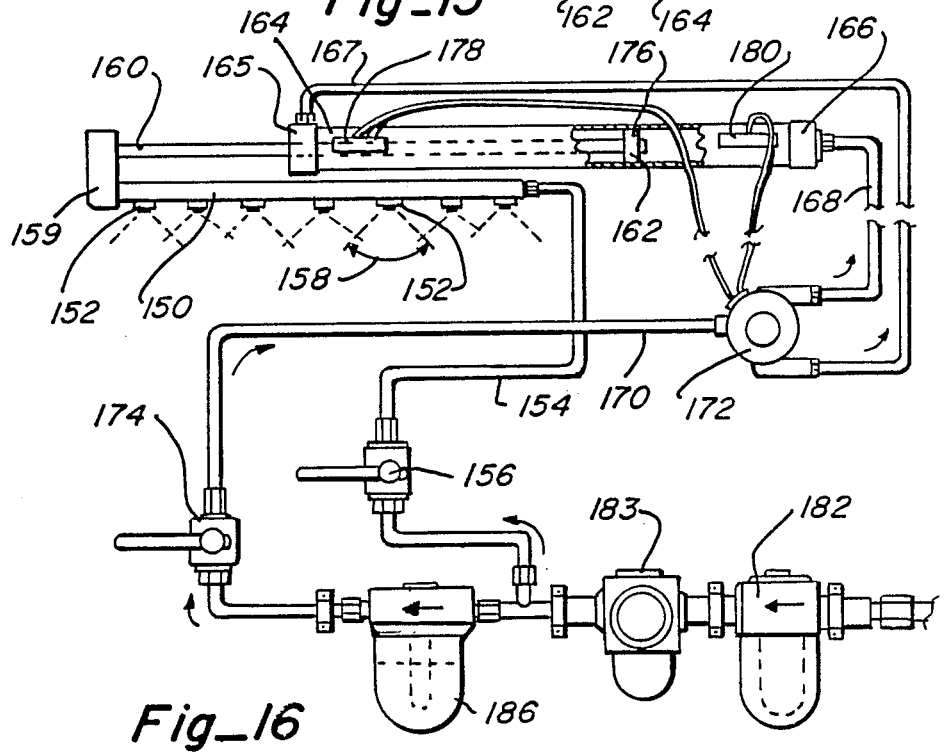
Fig_16

APPARATUS FOR CLEANING AIR FILTERS

TECHNICAL FIELD

This invention relates to an apparatus for cleaning an air filter, and more particularly, to an apparatus for cleaning an air filter by shaking and turning the filter and also by simultaneously applying selected combinations of air suction and air pressure to the filter.

BACKGROUND ART

Air filters are widely used on internal combustion engines driving heavy equipment, combines, trucks and the like to remove impurities from the air before the air enters the engine for combustion. Such air filters typically trap and remove from the air large quantities of impurities such as dust, dirt, sand, and even rocks. After a period of use, the filters become clogged with trapped impurities which must be removed in order for the filters to be useful once again.

Various approaches have been utilized to clean air filters, with the approaches generally using forced air flow through the filters. The forced air flow may be created by using either air pressure, air suction, or a combination of both. One problem encountered with conventional air cleaning apparatuses has been that the air flow provided through the filter may not be the particular air flow best suited for cleaning that particular filter. For example, a common annular air filter used on larger engines driving trucks, heavy equipment and the like which traps impurities as they move from the filter's outer periphery toward its center may best be cleaned by an air flow in an outward direction, away from the center of the filter, thereby driving the trapped particles back along the path by which they entered the filter. Such air flow may be created by an outward air suction applied to the outer periphery of the filter, by an outward air pressure from the inner periphery of the filter, or by a combination of such suction and pressure. However, most well known filter cleaning apparatuses are capable of producing air flow in only one direction relative to the filter. Examples of such conventional filter cleaners may be seen in U.S. Pat. No. 3,360,907 (pressurized air applied to outer periphery); U.S. Pat. No. 3,345,805 (suction applied to outer periphery); U.S. Pat. No. 4,364,755 (suction applied to inner periphery); and U.S. Pat. No. 4,266,953 (pressure applied to one side and suction to the other).

In cleaning an air filter, it is also desirable to vibrate the filter in order to shake loose trapped impurities. In one known arrangement, this vibration is transferred to the filter by striking the filter directly. A problem associated with this approach is that it tends to create wear and tear of both the striking mechanism and the filters being cleaned. Examples of such striking arrangements are provided in U.S. Pat. No. 4,345,353 and U.S. Pat. No. 4,258,451. Alternatively, the supporting structure for the filter may be shaken, thereby causing the filter itself to shake, as illustrated in U.S. Pat. Nos. 4,328,014 and 3,639,940.

When cleaning an air filter using forced air flow, it is also desirable that the air flow be applied to the entire peripheral surface area of the filter, in order to assure that the filter is thoroughly cleaned. This has typically been accomplished by rotating the filter to expose its entire circumference to air flow, and by moving the source of the air flow back and forth along the depth of the filter's periphery to fully expose that dimension of the filter to air flow. Examples of these approaches are provided in U.S. Pat. Nos. 3,360,907 and 3,345,805.

DISCLOSURE OF THE INVENTION

In accordance with the present invention, an apparatus is provided for cleaning air filters. The apparatus includes a vibrating support member having a generally V-shaped upper surface for cradling the filter during cleaning and for shaking loose trapped impurities from the filter. The support member includes a first and a second inclined wall sloping down and in from outer side edges toward adjacent inner side edges. The support member is preferably vibrated by an eccentric weight rotating on a motor-driven shaft. The first inclined wall is sloped more steeply than the second inclined wall, thereby causing a rotation of the filter as it is vibrated and allowing a more thorough cleaning of the filter. The support member is advantageously mounted on a frame suspended by springs and flexible straps. The springs are attached at outer side edges of the first inclined wall and to an adjacent first housing sidewall, and the flexible straps are attached at outer side edges of the second inclined wall and to an adjacent second housing sidewall.

An air blowing tube having air nozzles is provided to blow pressurized air through the filter from a filter periphery. Optionally, the air blowing tube reciprocates across the periphery to more thoroughly clean the filter. For best results, the air blowing tube is adjustable in height to position the tube contiguously with the filter, to allow air to be blown through the filter selectively from either the inner or the outer periphery of the filter. This may be accomplished by suspending the tube from a cantilevered support member attached to a vertical post capable of telescoping into a sleeve. By hinging the post at its bottom, the post may also be made tiltable to allow the tube to remain contiguous with irregular shaped filters, such as conical filters.

An inner suction tube having a longitudinal suction slot may also be provided for applying suction to the inner periphery of the filter. An exhaust blower is connected to the tube to cause suction in the tube and to remove impurities from the apparatus. The exhaust blower is also connected to a suction port which opens into a channel running lengthwise along the bottom of the table. In this way, suction may be provided at the bottom of the table to remove particles which have been loosened from the filter and also to further provide suction to aid in such loosening. An optional air flow diverter selectively directs the exhaust air flow through the suction tube, the table suction channel, or a combination of both, to optimally suit a particular cleaning operation.

Additional advantages of this invention will become apparent from the description which follows, together with the accompanying drawings.

BRIEF DESCRIPTION OF THE DRAWINGS

FIG. 1 is a top perspective view of an air filter cleaning apparatus in accordance with the present invention;

FIG. 2 is a top plan view of the air filter cleaning apparatus of FIG. 1, showing the relative positions of the motor, cam and cam shaft, support member, and support member support frame;

FIG. 3 is a front cross-sectional view of the air filter cleaning apparatus taken along line 3—3 of FIG. 12, with an air filter in position for cleaning and showing the air flow through the apparatus and the motor-eccentric cam arrangement for shaking the air filter support member;

FIG. 4 is a cross-sectional view of the cam shaft and the eccentric weight taken along line 4—4 of FIG. 3, showing their connection to the filter support member;

FIG. 5 is a cross-sectional view taken along line 5—5 of FIG. 3, showing suspension mounting belt and its connection to the frame;

FIG. 6 is a cross-sectional view of the rear suspension spring taken along line 6—6 of FIG. 4, showing the connection of the spring to the housing and the frame;

FIG. 7 is a cross-sectional view taken along line 7—7 of FIG. 4, showing the mounting of the cam shaft and eccentric cam to the support table;

FIG. 8 is a cross-sectional view taken along line 8—8 of FIG. 3, showing the suction tube with the suction slot extending along the length of the tube;

FIG. 9 is a side cross-sectional view of the suction tube taken along line 9—9 of FIG. 8, showing the positioning of the suction control member within the tube;

FIG. 10 is a cross-sectional view taken along line 10—10 of FIG. 8, showing the particle guide flaps and the suction aperture closing strip in their positions relative to the suction tube;

FIG. 11 is a cross-sectional view taken along line 11—11 of FIG. 3, showing the air flow diverter positioned for maximum air flow through the suction tube and for no suction through the support member duct;

FIG. 12 is a cut-away side elevational view of the air filter cleaning apparatus, showing the suction tube removed and the air blowing tube in a lowered position and forcing air outward from the center of an air filter;

FIG. 13 is a cut-away side elevational view of the air filter cleaning apparatus with the suction tube and the air blowing tube in an inclined position for cleaning a conical filter;

FIG. 14 is a side view of a filter flange in position in the flange holder;

FIG. 15 is a schematic diagram of the electrical circuit of the air filter cleaning apparatus; and FIG. 16 is a side elevational view partially cut away showing the pneumatic reciprocating action of the blowing tube and associated control valves.

DETAILED DESCRIPTION

In accordance with the present invention as depicted in FIGS. 1-3, an apparatus A is provided for cleaning an air filter 10 suitable for use on a relatively large engine driving trucks, heavy equipment, and the like. The air filter 10 is annular in shape and has a semi-porous trapping portion 12 in which impurities are caught by the filter 10 and removed from the air. The trapping portion 12 is bounded by an inner peripheral surface 14 and an outer peripheral surface 16. Filters of other shapes may also be cleaned by use of the apparatus A, as will be discussed later.

A support member 17 is made of first and second walls 20 and 22 inclined from outer edges 18 and 19 toward adjacent spaced apart inner edges 23 and 24 in a generally V-shaped configuration. The support member 17 supports the air filter 10 in a cradle-like manner during the cleaning operation. The first inclined wall 20 is shown as inclined down from the horizontal at an angle designated B of about 40 degrees. This angle may be varied to some extent as between 35 and 50 degrees. An angle of 45 degrees has been found satisfactory in one embodiment. The second inclined wall is shown inclined down from the horizontal at an angle designated C of about 22.5 degrees. This angle may be varied to some extent as between 20 and 30 degrees. An angle of 25 degrees has been found satisfactory in one embodiment. For selected inclined wall angles B and C, the centers of filters of different sizes will be disposed along a common center line D, which is displaced from the vertical by an angle E. An angle E of about 10 degrees has been found satisfactory in one embodiment. Inner edges 23 and 24 of the inclined walls 20 and 22 are spaced apart to define a slot 25 extending lengthwise along the bottom of the support member 17. Inclined walls 20 and 22 preferably have rubber pads 26 and 27 covering the walls 20 and 22 to provide resilient support for the air filter 10 as it is cleaned. The support member 17 also includes a channel 30 extending downward from the slot 25 and enclosed by longitudinally extending channel side walls 31 and 32 and channel bottom 33.

The walls 20 and 22 are rigidly mounted on a skeletal frame 40 which includes vertical members 41, 42, 43 and 44 at each corner of the support member 17 and front and rear end members 45. The walls and frame 40 are suspended from an outer housing 34 by laterally spaced front and rear suspension springs 54 and 56, and by laterally spaced front and rear resilient suspension straps 58 and 60. Outer housing 34 includes sidewalls 35 and 36 and end wall 37, and is mounted on top of a base housing 38. The suspension springs 54 and 56 are mounted to front and rear corner supports 41 and 43, respectively, by mounting bolts 66 and 67 and nuts 68 and 69. Mounting hooks 70 and 72 extend from the bolts 66 and 67, and the springs 54 and 56 are stretched from the bolt mounting hooks 70 and 72 to housing mounting hooks 74 and 76, which protrude from housing sidewall 35. Suspension straps 58 and 60 are mounted to the front and rear corner supports 42 and 44, respectively, by bolts 78 and 80, and to the support member housing 34 near the front and rear of the sidewall 36 by bolts 82.

In order to loosen trapped particles and impurities from the air filter 10, the support member 17 is vibrated, thereby shaking the supported filter 10. This vibrating effect is created by use of an electric motor 84 having a drive shaft 86 connected to a rotatable shaft 88 by a drive belt 90. Motor 84 is mounted to housing 34 by suspending the motor from a bracket 91. In this way, the weight of the motor 84 serves to maintain tension in the drive belt 90. As shown in FIG. 15, a variable speed control 85 is preferably provided to allow the vibration to be adjusted to best suit a particular cleaning operation. The motor 84, a variable speed control rheostat 85, and an on-off control switch SW1 are connected across a suitable electric power source. The control 85 changes the speed of the motor thereby changing the vibrating action, with increased speed producing increased shaking action. As illustrated in FIGS. 4 and 7, an eccentric weight 92 is mounted on the shaft 88 to create a vibrating effect as the shaft 88 is rotated. The vibrating effect from the rotation is due to the center C2 of the weight 92 being offset from the center C1 of the shaft 88. The shaft 88 is rotatably mounted in a pair of spaced pillow block bearings 94 which are rigidly bolted to the support member 17 by bolts 96 and nuts 98. In particular, the mounting is on the back side of wall 20. The rigid connection of the shaft 88 to the support member 17 allows the oscillating action created by the unbalanced weight 92 to be transferred to the support member 17, thereby vibrating the support member 17. This vibration is enhanced by the resilient suspension of the walls 20 and 22 and the frame 40 from the housing 34. As the support member 17 is vibrated, the greater incline B of wall 20 relative to the incline C of wall 22 causes the air filter 10 to rotate in a clockwise direction, as shown by arrow 99 in FIG. 3. This rotation of the air filter 10 allows uniform cleaning of the entire filter to be performed.

As trapped particles are removed from the filter 10, the larger particles migrate downward along the inclined walls 20 and 22 until they fall into the channel 30 between the walls 20 and 22. Finer particles generally form dust clouds as they are removed from the filter 10. Both the larger and the smaller particles are disposed of by suction provided through lower suction duct 106, which joins at one end to the channel 30 through channel port 110 and is connected at the other end to blower 112 driven by a motor 113. A switch SW2 is connected in series with blower motor 113 and these are connected across the power source as seen in FIG. 15 so that the blower motor is actuated when SW2 is closed. Blower 112 creates a downward air flow 114 through the suction duct 106, as indicated in FIG. 3 by flow arrows 114. This air flow 114 sucks the particles down through the channel 30, through the suction duct 106 and into the blower 112, from where the particles are blown out of the apparatus A through exhaust duct 115 as indicated by flow arrow 116. In addition to removing loose particles, when applied to the outer periphery 16 of the filter 10, the suction applied through channel 30 also serves to loosen and free trapped particles from the filter 10.

Suction control member 117 slides longitudinally in guide tracks 118 along the upper portion of the channel 30 to confine air flow through the channel 30 to selected areas, which are typically the areas directly beneath the filter being cleaned. This action effectively confines the suction to the selected area and results in much greater suction in that area than if the suction were allowed to be diffused along the entire length of the slot 25. The sliding action is accomplished manually by gripping knob 119 and slidably adjusting the control member 117 as desired. Control member 117 may be constructed of any flexible material, such as rubber or leather.

Referring now to FIGS. 1-3 and 8-10, an upper suction tube 120 is provided. The upper suction tube 120 is connected through upper suction duct 122 to blower 112, which provides air flow 124 through the tube 120, down through the suction duct 122, and out the exhaust duct 115. Narrow suction slot 126 is applied to the inner periphery 14 of an air filter 10 to suck trapped particles from the filter 10, after which the particles are exhausted from the apparatus A through suction duct 122 and exhaust duct 115. Particle guide flaps 128 ensure that freed particles are sucked into suction slot 126. It is particularly important that the finer particles do not escape from the suction action, as these particles are generally in the form of a fine dust which will float around in the surrounding air if not controlled. Guide flaps 128 are preferably made of a semi-rigid material such as rubber, to provide a snug fit with the inner periphery 14 of the air filter 10.

The suction slot 126 is opened and closed along the length of the slot 126 by sliding suction control member 130. Control member 130 may be made of any flexible material such as rubber or leather, and is slidable in guide track 132 along the length of the suction slot 126 by manually gripping knob 133 and adjusting the control member 130 as desired. When the control member 130 is positioned all the way to the rear of the slot 130, no air may flow through the slot 126. As the control member 130 is moved forward from the rear of the slot 126, air is allowed to pass through that portion 134 of the slot 126 to the rear of the control member 130. In practice, the length of this effective suction portion 134 of the slot 126 is adjusted to coincide with the length of the air filter 10 being cleaned. This results in much greater suction efficiency than would be provided if suction were allowed to occur in portions of the slot 126 not directly applied to the air filter 10.

Referring now to FIGS. 3 and 11, an air flow diverter 136 is provided in an air chamber 138 to regulate the flow of air through upper suction duct 122 and lower suction duct 106. The air chamber 138 opens into blower 112 and ducts 106 and 122 through air flow parts 139, 140 and 141, respectively. The diverter 136 is shown in FIG. 5 in a closed position relative to the lower suction duct. In this position, no air flow is possible through the lower suction duct, and all the exhaust air flow occurs through the upper suction duct 122. Conversely, diverter 136 may be positioned so as to shut off all air flow through the upper suction duct 122, thereby assuring that all air flow is through the lower suction duct 106. Still another alternative is to set the diverter 136 at a selected intermediate point between the two ducts 106 and 120, thus splitting the air flow between the two ducts in the desired ratio. The position of the diverter 136 is controlled by turning control lever 142 to the desired setting. This activates a control cable 144, which is attached at one end to control lever 142 and at the other end to connecting rod 146, thereby moving the diverter 136 back and forth. This air flow control capability is useful in allowing more efficient utilization of air flow, by allowing variation of the air flow to best suit the existing circumstances. For example, a cleaning operation which produces relatively large amounts of dust might call for maximum suction in the lower suction duct 106 to best remove the dust from the environment. On the other hand, in the later stages of cleaning, maximum suction applied to the inner filter periphery 14 might be most effective in removing the last remaining trapped particles. This latter situation would call for maximum air flow through the upper suction duct 122 and upper suction tube 120.

Referring now to FIGS. 1-3 and 16, a pressurized air blowing tube 150 having spaced air nozzles 152 is connected to a source (not shown) of pressurized air by an air hose 154. The air pressure level in the tube 150 and the force of the air blown from the nozzles 152 are manually regulated by flow control valve 156. As shown in FIG. 3, air nozzles 152 may be applied to the outer periphery 16 of the filter 10 to blow air inward through the filter 10. The force of this air through the filter trapping portion 12 tends to loosen particles trapped therein and to drive them out of the filter 10. As the filter 10 is rotated by vibration of the table 18, the entire outer periphery 16 of the filter 10 is successively exposed to air flow from the nozzles 152, resulting in a thorough and uniform cleaning of the filter 10. For best results, the nozzles 152 have a spray angle 158 of approximately 80 degrees, and are spaced so that air flows from adjacent nozzles are overlapping.

As best seen in FIGS. 12 and 13, the air blowing tube 150 is attached by a connecting member 159 to one end of a reciprocating piston rod 160 which has a piston 162 at its other end. Piston 162 and piston rod 160 reciprocate back and forth in a cylinder 164 which is connected at its front 165 and at its rear 166 to a pressurized air source (not shown), such as a tank of compressed air, by front and rear secondary air hoses 167 and 168. Pressurized air is delivered to the secondary air hoses 167 and 168 by a primary air hose 170 through a solenoid 172, which permits air flow through only one of the secondary air hoses 167 and 168 at any one time. A reciprocating action of the piston 162 occurs as the solenoid 172 alternates air flow and pressure between the front 165 and rear 166 of the cylinder 164. This alternating action is created by a permanent magnet 176 on piston 162 which alternately activates front and rear magnetic switches 178 and 180 as the piston 162 moves in the cylinder 164. A permanent magnet 176 suitable for mounting on the piston 162 is the Model RS1 switch manufactured by Humphrey Products in Kalamazoo, Mich. Air flow and pressure in the primary hose 170 is manually regulated by flow control valve 174, thereby controlling the speed of the reciprocating action. To keep impurities out of the air hoses 154 and 170, an air filter 182 is provided to clean air coming from the pressurized air source (not shown). An air pressure regulator 183 regulates the pressure of the air entering the hoses 154 and 170, and variable control valves 156 and 174 thereafter control the air pressure delivered through the respective hoses 154 and 170 to the air spray tube 150 and the cylinder 164. An optional air oiler 186 emits a fine mist of oil into the air to be delivered to the cylinder 164. This oil lubricates the action of the piston 162 in the cylinder 164, and also provides a more air-tight seal between the piston 162 and the cylinder 164.

In operation, as the magnet 176 approaches the front switch 178, the switch 178 is magnetically activated. When activated, the switch 178 allows an electrical signal provided by the power source to be transmitted to an associated coil 178a in the solenoid 172, causing air flow from primary hose 170 to be diverted entirely through front secondary hose 167. This air flow creates air pressure at the front end 165 of the cylinder 164, thereby driving the piston 162 toward the rear end 166 of the cylinder 164. As the magnet 176 approaches the rear switch 180, the rear switch 180 is activated, energizing coil 180a of solenoid 172 to divert the air flow entirely through rear secondary hose 168, creating air pressure at the rear 166 of the cylinder 164 and driving the piston 162 toward the front 165 of the cylinder 164. The magnet 176 then approaches and magnetically activates the front switch 178, thereby continuing the reciprocating cycle of the piston 162. This continuous reciprocating action is transferred to the air blowing tube 150 through connecting member 159, thereby moving the blowing tube 150 back and forth along the length of the air filter 10. This allows a more thorough cleaning of the filter 10 than would be possible using a stationary air spray tube.

Turning now to FIGS. 1, 12, and 13, it will be seen that the respective heights of the suction tube 120 and the air blowing tube 150 relative to the support member are adjustable to accommodate filters of varying sizes. Blowing tube support member 190 has a cantilever beam portion 192 from which the air spray tube 150 is suspended, and a column portion 194 which is capable of telescoping upward and downward within a sleeve 196. The sleeve 196 may be loosened by loosening height adjustment screw 198, thereby allowing the telescoping movement of the support column 194 to the desired height. When the air blowing tube 150 reaches the selected height, the height adjustment screw 198 is tightened to hold the air blowing tube 150 is position. The sleeve 196 and the column 194 are tilted from the vertical by the angle E of FIG. 3, so that telescoping movement of the column is along the common center line D of filters of differing diameters. In this way, a close fit may be achieved between the air blowing tube 150 and filters of various sizes. In like fashion, a suction tube sleeve 200 is also provided, and encloses the suction duct 122 as well as the suction tube 120. The suction tube 120 is capable of telescoping to various heights within sleeve 200 by loosening adjustment screw 202, moving the tube 120 to the desired height, and tightening the height adjustment screw 202 to hold the tube 120 in place. The suction tube 120 and the sleeve 200 are displaced from the vertical by the angle E so that telescoping movement of the tube 120 coincides with the common center line of filters of different diameters. Once again, this allows a close fit to be achieved between the suction tube 120 and filters of various sizes.

Suction tube 120 fits into the upper suction duct 122, with the two being joined together by a connecting pin 204 above the sleeve 200. As shown in FIG. 10, the suction tube may be removed by removing the connecting pin, thereby allowing the air blowing tube 150 to be lowered into position for blowing air outward from the inner periphery 14 of the filter 10. This capability of blowing air outward through a filter is useful for removing trapped particles which are more susceptible to air flow outward through the filter. Outward air flow is particularly effective in cleaning filters which, in their original operation, filtered air traveling inward through the filter. In filters of this type, outward air flow allows trapped particles to flow back in the direction from which they came, which is often more easily accomplished than attempting to force the particles inwardly through the filter.

Referring now to FIGS. 13 and 14, it is common for filters to have a flange 206 at one end. Advantageously, a flange holder 208 and 209 may be provided on ends of the first and second inclined walls to accommodate the flange 206 and to secure the filter 10 in place during cleaning. Air blowing tube 150 and suction tube 120 may also be tilted to allow effective cleaning of a conical-shaped filter 210. This is made possible by the use of a mounting plate 220 which rigidly connects the two sleeves 196 and 200 and is tiltably mounted to center post 222 by tilt adjustment screw 224. Loosening tilt adjustment screw 224 allows the suction tube 120 and air blowing tube 150 to be tilted to an orientation parallel to the side of the filter 210 to be cleaned. Once this orientation has been achieved, tightening the tilt adjustment screw 224 will hold the suction tube 120 and the air blowing tube 150 firmly in place during the cleaning operation. Alternatively, the suction tube 120 may also be removed and the air blowing tube 150 used alone in a tilted orientation on the inner periphery 214 of filter 210.

Although the present invention has been described with a certain degree of particularity, it is understood that the present disclosure has been made by way of example and that changes in details of structure may be made without departing from the spirit thereof.

What is claimed is:

1. Apparatus for cleaning an air filter comprising:
   support means for an air filter having trapped impurities, said support means including first and second inclined walls arranged in a generally V-shaped configuration, said inclined walls sloping down at selected angles from the horizontal and in from outer edges toward adjacent inner edges, said first wall being more steeply inclined that said second wall to effect rotation of said air filter upon being vibrated; and means for vibrating said support member to shake the supported air filter so that trapped impurities are loosened from said filter and so that said air filter is rotated while supported on said support means.

2. Apparatus as claimed in claim 1, further including: resilient mounting means suspending said support means for vibrating movement.

3. Apparatus as claimed in claim 2, wherein said mounting means includes:
at least two springs attached at the outer edges of said first inclined wall; and
at least two flexible straps attached at the outer edges of said second inclined wall.

4. Apparatus as claimed in claim 3, further including:
a frame on which said inclined walls are mounted along the outer edges of said walls, with said inner edges of said walls extending into said frame.

5. Apparatus as claimed in claim 1, further including:
lower suction means at the bottom of said support means for removing said loosened impurities from said support means.

6. Apparatus as claimed in claim 5, wherein said lower suction means includes:
two opposing channel walls extending downward from said adjacent inclined wall edges and forming a channel extending longitudinally along the bottom of said support member;
a channel bottom extending along the length of said channel between said channel walls and having a suction port therein; and
a lower suction duct connected at a first end to said suction port and at a second end to said exhaust blower to provide suction to remove said loosened impurities from around said channel.

7. Apparatus as claimed in claim 6, further including:
means for closing a selected portion of said channel to air flow.

8. Apparatus as claimed in claim 6, further including:
a chamber in communication with said blower, said lower suction duct, and said inner suction tube duct; and
an air diverter blade within said chamber between said ducts, said diverter blade being selectively movable between a first position closing off air flow from said lower suction duct to said chamber and a second position closing off air flow from said inner suction tube duct to said chamber, to regulate air flow levels in said respective ducts.

9. Apparatus as claimed in claim 1, further including:
an inner suction tube having a suction slot contiguous to an inner periphery of the air filter for applying suction to remove trapped impurities from said air filter; and
an exhaust blowing means and duct means for connecting said blower to said inner suction tube.

10. Apparatus as claimed in claim 1, further including:
blowing means for moving air through a periphery of said air filter to loosen trapped impurities therefrom.

11. Apparatus as claimed in claim 10, further including:
means for reciprocating said blowing means relative to said filter periphery as said blowing means blows air through said periphery.

12. Apparatus as claimed in claim 11, further including:
means for changing the speed at which said blowing means reciprocates relative to said filter periphery.

13. Apparatus as claimed in claim 10, further including:
an inner suction tube having a suction slot contiguous to an inner periphery of the air filter for applying suction to remove trapped impurities from said air filter; and
an exhaust blowing means and duct means for connecting said blower to said inner suction tube.

14. Apparatus as claimed in claim 13, further including:
valve means for closing a selected portion of said suction slot to air flow to adjust to air filters of different lengths.

15. Apparatus as claimed in claim 13, further including:
adjustable mount means for mounting said blowing means and said inner suction tube so that said blowing means and said inner suction tube are tiltable to selected angles relative to said support means to accommodate tapered air filters.

16. Apparatus as claimed in claim 13, further including:
a first mounting sleeve for mounting said blowing means and a second mounting sleeve for said inner suction tube, said blowing means and said inner suction tube being in telescoping relation with said sleeves for adjustment to selected heights relative to said support means.

17. Apparatus as claimed in claim 16, wherein:
said inner suction tube is removable; and
said blowing means is selectively mountable either contiguous to an inner or an outer periphery of said air filter.

18. Apparatus as claimed in claim 13, further including:
a pair of flexible guide members adjacent to and on opposite sides of said suction slot and extending to said inner filter periphery to guide said loosened impurities into said suction tube.

19. Apparatus as set forth in claim 13, wherein said blowing means and said inner suction tube are mounted so that the centers of air filters on said support means of different diameters are disposed along a common center line at a selected angle to the vertical to accommodate a range of different sizes of air filters.

20. Apparatus as set forth in claim 19, wherein said selected angle is about ten degrees.

21. Apparatus as claimed in claim 10, wherein said blowing means includes:
a blowing tube having a plurality of air nozzles mounted at spaced intervals along a support arm; and
pressurized air supply means pneumatically connected to said tube for supplying air under pressure to said tube for blowing outward through said nozzles.

22. Apparatus as claimed in claim 21, wherein:
said spaced nozzles are arranged in a line and air is blown from said nozzles within a spray angle to cover the area between said nozzles.

23. Apparatus as claimed in claim 22, wherein said spray angle is approximately eighty degrees.

24. Apparatus as claimed in claim 22, further including:
means for varying the pressure of the air supplied to said tube to control the force of air blown from said nozzles.

25. Apparatus as claimed in claim 1, wherein said means for vibrating includes:
a shaft having an eccentric weight thereon, said shaft being connected to said first inclined wall; and
drive means for rotating said shaft to cause a vibrating effect on said support member.

26. Apparatus as set forth in claim 1, wherein said first inclined wall slopes down at an angle between about 35 and 50 degrees.

27. Apparatus as set forth in claim 1, wherein said second inclined wall slopes down at an angle of between about 20 and 30 degrees.

28. Apparatus as claimed in claim 1, wherein said air filter has a flange at one end, and further including:
bracket means on said support member for receiving said flange to secure the filter in position during cleaning.

29. Apparatus for cleaning an air filter having an inner and an outer periphery, said apparatus comprising:
a support member for an air filter having trapped impurities, said support member including first and second inclined walls arranged in a generally V-shaped configuration, said inclined walls sloping down and in from outer edges toward adjacent, spaced apart inner edges, said first wall being more steeply inclined than said second wall;
means for vibrating said support member to shake a supported air filter so that trapped impurities are loosened therefrom and so that said air filter is rotated on said support member;
resilient mounting means to suspend said support member for vibration;
blowing means for moving air through said filter to loosen trapped impurities therefrom;
means for reciprocating said blowing means relative to a periphery of said filter as said blowing means blows air through said filter;
lower suction means located at the bottom of said support member for removing said loosened impurities;
an inner suction tube having a suction slot contiguous to said inner filter periphery for applying suction to remove trapped impurities from said filter;
an exhaust blower and a duct for pneumatically connecting said blower to said suction tube; and
means for closing a selected portion of said suction slot to air flow.

* * * * *